United States Patent
Lin et al.

(10) Patent No.: US 11,709,353 B2
(45) Date of Patent: Jul. 25, 2023

(54) ILLUMINATION SYSTEM AND PROJECTION DEVICE

(71) Applicant: Coretronic Corporation, Hsin-Chu (TW)

(72) Inventors: Sheng-Chiang Lin, Hsin-Chu (TW); Chen-Wei Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/729,005

(22) Filed: Apr. 26, 2022

(65) Prior Publication Data

US 2022/0357571 A1    Nov. 10, 2022

(30) Foreign Application Priority Data

May 7, 2021    (CN) .......................... 202120953666.4

(51) Int. Cl.
    *G02B 26/00*    (2006.01)
    *G03B 21/20*    (2006.01)

(52) U.S. Cl.
    CPC ......... *G02B 26/008* (2013.01); *G03B 21/204* (2013.01); *G03B 21/208* (2013.01); *G03B 21/2033* (2013.01); *G03B 21/2066* (2013.01)

(58) Field of Classification Search
    CPC . G03B 21/204; G03B 21/2066; G02B 26/008
    See application file for complete search history.

(56) References Cited

U.S. PATENT DOCUMENTS

| | | | |
|---|---|---|---|
| 2015/0316775 A1* | 11/2015 | Hsieh ................. | G03B 21/2013 353/31 |
| 2018/0173087 A1* | 6/2018 | Hsieh ................. | G03B 21/2033 |
| 2019/0215498 A1* | 7/2019 | Chung ................ | G03B 21/204 |
| 2020/0019049 A1* | 1/2020 | Liu ..................... | G03B 21/204 |
| 2020/0159101 A1* | 5/2020 | Fan .................... | G03B 33/08 |

FOREIGN PATENT DOCUMENTS

| | | |
|---|---|---|
| CN | 207817393 | 9/2018 |
| CN | 208547803 | 2/2019 |
| CN | 111190322 | 5/2020 |

\* cited by examiner

*Primary Examiner* — William N Harris
(74) *Attorney, Agent, or Firm* — JCIPRNET

(57) ABSTRACT

An illumination system and a projection device are provided. The illumination system includes a laser light source, a light splitting element, a wavelength conversion module, a filter module, and a homogenizing element. The laser light source provides a laser beam to the light splitting element. The filter module rotates around a rotation axis and has multiple dichroic filter regions on a surface perpendicular to the rotation axis. The filter module receives the laser beam from the light splitting element, and an acute angle is formed between the rotation axis and a direction in which the laser beam enters the filter module. The homogenizing element is located on a transmission path of the laser beam penetrating the filter module, and the laser beam enters the homogenizing element along a long axis direction of the homogenizing element.

21 Claims, 10 Drawing Sheets

ILLUMINATION SYSTEM AND PROJECTION DEVICE

CROSS-REFERENCE TO RELATED APPLICATION

This application claims the priority benefit of China application serial no. 202120953666.4, filed on May 7, 2021. The entirety of the above-mentioned patent application is hereby incorporated by reference herein and made a part of this specification.

BACKGROUND

Technical Field

The invention relates to an optical system and an optical device, and particularly relates to an illumination system and a projection device.

Description of Related Art

In recent years, projection devices equipped with solid-state light sources such as light-emitting diodes (LEDs) and laser diodes (laser diodes) have gradually gained a place in the market. Since laser diodes have a luminous efficiency higher than about 20%, in order to eliminate the limitation of use of light-emitting diodes as the light sources, models that use laser light sources as the light sources for projectors have gradually been developed.

Generally speaking, a projection device using a laser light source as the light source includes a configuration of optical modules such as a wavelength conversion module, a filter module, a light valve, and a projection lens. Specifically, the filter module is arranged in the back stage of the light path of the wavelength conversion module, so that a predetermined color light can be filtered out of the color lights of different wavelength bands from the wavelength conversion module by the filter module, thereby purifying the color to achieve the effect of color saturation. Then, these color lights are modulated by the light valve so as to project an image beam to the outside.

In the related art, in order to reduce the size of the system, a projection device is proposed which is provided with a two-stage light splitting design and allows the laser beam to enter from one side of a light splitting element. In such a projection device, since the laser beam needs to deviate from the optical axis to enter a condenser lens, the condenser lens needs to reach a certain size as compared with a case where the laser beam enters along the optical axis. In addition, in such a projection device, the wavelength conversion module needs to be a sequentially rotating element, so that the color lights of different wavelength bands from the wavelength conversion module can cover all visible light wavelength bands.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an illumination system which has a small size and provides an illumination beam with favorable uniformity.

The invention provides a projection device which has a small size and provides favorable image quality.

Other objectives and advantages of the invention can be further understood from the technical features disclosed in the invention.

In order to achieve one or part or all of the above objectives or other objectives, an embodiment of the invention provides an illumination system. The illumination system is configured to emit an illumination beam, and the illumination system includes a laser light source, a light splitting element, a wavelength conversion module, a filter module, and a homogenizing element. The laser light source is configured to provide a laser beam to the light splitting element. The wavelength conversion module has a wavelength conversion region for receiving the laser beam. The filter module is configured to rotate around a rotation axis and has a plurality of dichroic filter regions on a surface perpendicular to the rotation axis. The filter module receives the laser beam from the light splitting element, and an acute angle is formed between the rotation axis and a direction in which the laser beam enters the filter module. In a first period, the laser beam penetrates a first dichroic filter region of the plurality of dichroic filter regions to form the illumination beam. In a second period, the laser beam is reflected to the wavelength conversion module through a second dichroic filter region of the plurality of dichroic filter regions, the laser beam is converted into a wavelength conversion beam through the wavelength conversion region, and the wavelength conversion beam is transmitted to the filter module and penetrates the second dichroic filter region to form the illumination beam. The homogenizing element is located on a transmission path of the laser beam penetrating the filter module and the wavelength conversion beam, and the laser beam and the wavelength conversion beam enter the homogenizing element along a long axis direction of the homogenizing element.

In order to achieve one or part or all of the above objectives or other objectives, an embodiment of the invention provides a projection device. The projection device includes the above-mentioned illumination system, a light valve, and a projection lens. The light valve is arranged on a transmission path of the illumination beam from the illumination system and is configured to convert the illumination beam into an image beam. The projection lens is arranged on a transmission path of the image beam and is configured to project the image beam out of the projection device.

Based on the above, the embodiments of the invention have at least one of the following advantages or effects. In the embodiments of the invention, since different color light parts of the illumination beam respectively through the first dichroic filter region and the second dichroic filter region of the filter module can enter the homogenizing element along the long axis direction of the homogenizing element, the different color light parts of the illumination beam all have similar uniformity. As a result, the image beam has favorable color uniformity and provides favorable image quality. In addition, in the embodiments, since the wavelength conversion module can be a stationary element that does not move, there is no need to provide an actuator for rotating the wavelength conversion module. Therefore, a small-sized fixed wavelength conversion module can be used to reduce the noise generated during rotation.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
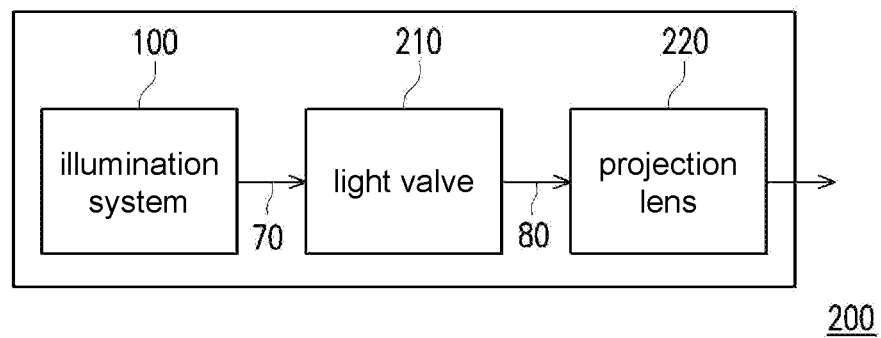
FIG. 1 is a block diagram of a projection device according to an embodiment of the invention.
Figure 2A:
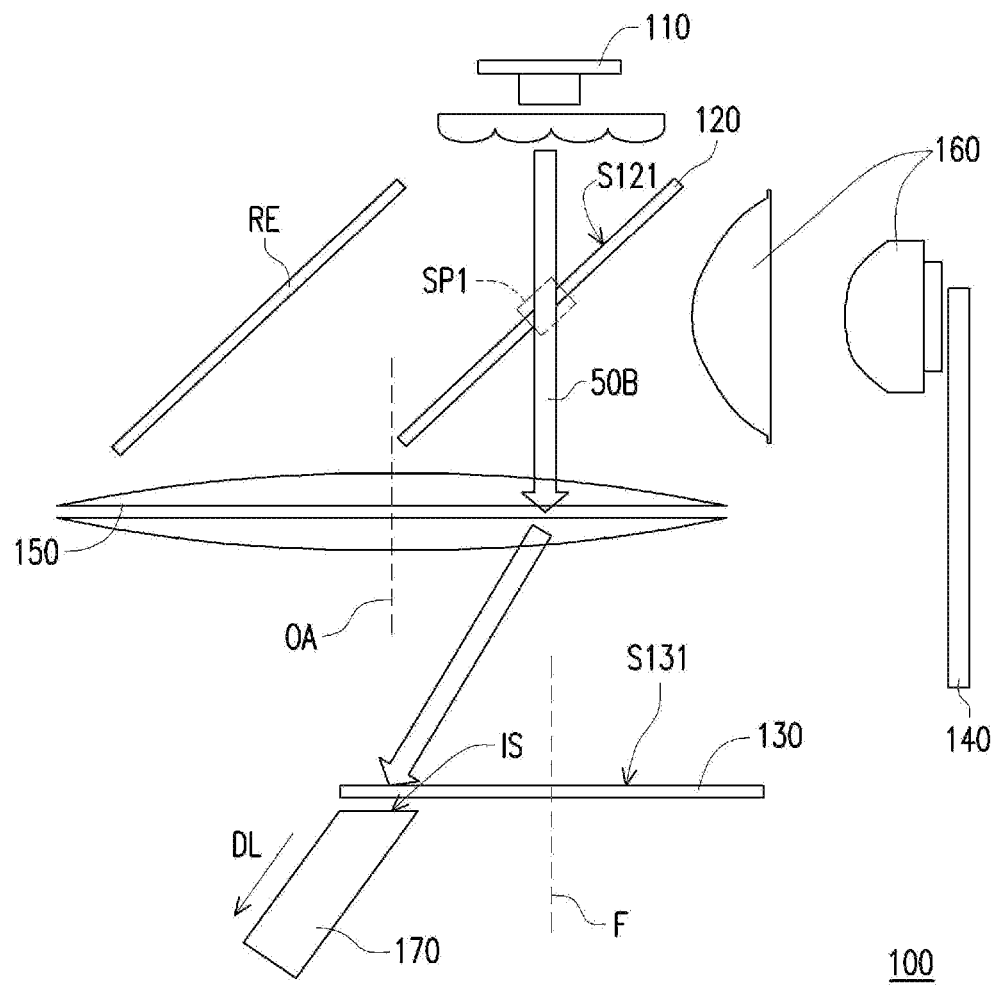
FIG. 2A is a schematic view of the light path of an illumination system of FIG. 1 in a first period.
Figure 2B:
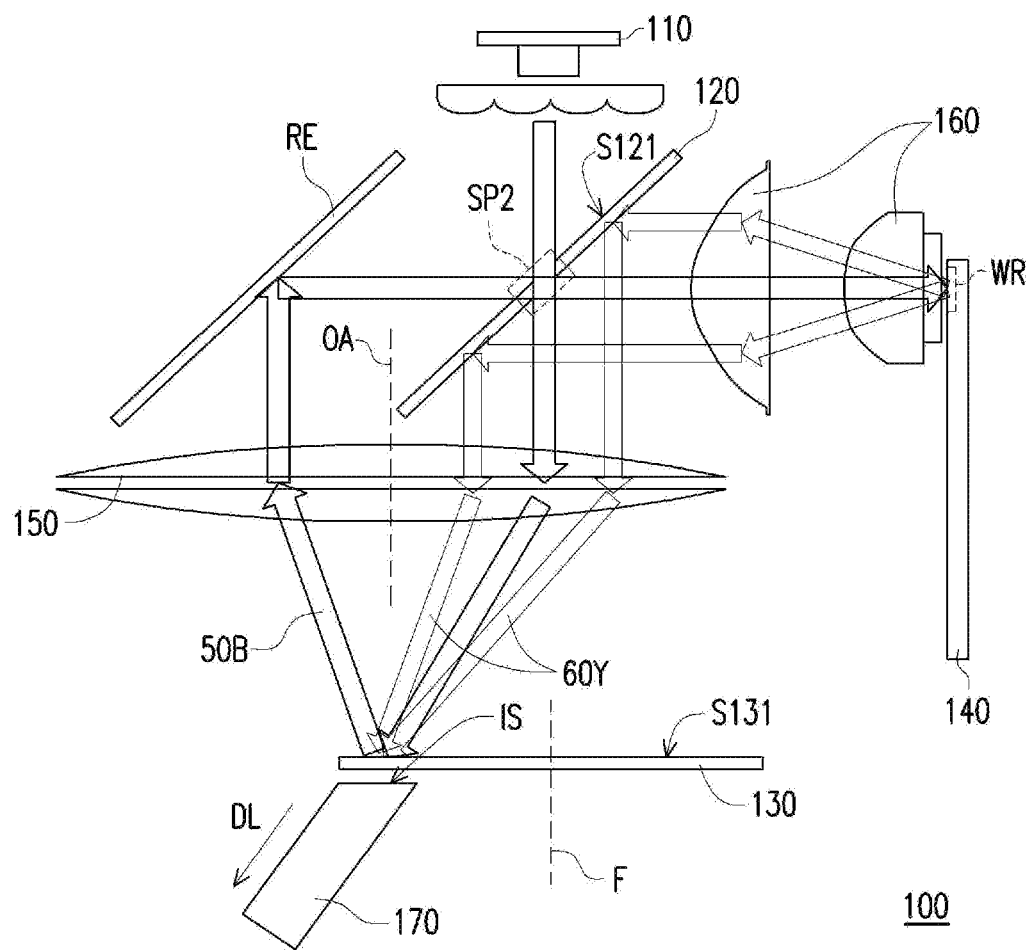
FIG. 2B is a schematic view of the light path of the illumination system of FIG. 2A in a second period.
Figure 2C:
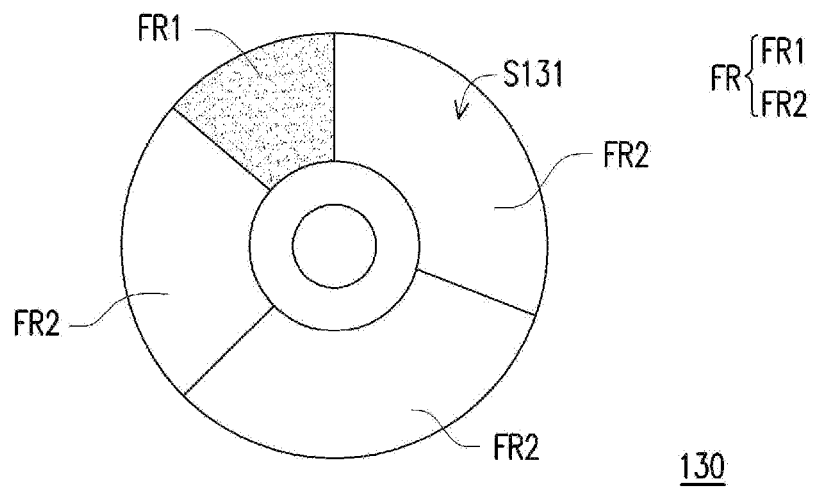
FIG. 2C is a top view of a filter module of FIG. 2A.

FIG. 1 is a block diagram of a projection device according to an embodiment of the invention. FIG. 2A is a schematic view of the light path of an illumination system of FIG. 1 in a first period. FIG. 2B is a schematic view of the light path of the illumination system of FIG. 2A in a second period. FIG. 2C is a top view of a filter module of FIG. 2A. Referring to FIG. 1, the projection device 200 includes the illumination system 100, a light valve 210, and a projection lens 220. The illumination system 100 is configured to provide an illumination beam 70. The light valve 210 is disposed on the transmission path of the illumination beam 70 from the illumination system 100 for converting the illumination beam 70 into an image beam 80. The projection lens 220 is disposed on the transmission path of the image beam 80 and is configured to project the image beam 80 out of the projection device 200. In this embodiment, the number of the light valves 210 is one, but the invention is not limited thereto. In other embodiments, the number of the light valves 210 may be more than one. In addition, in this embodiment, the light valve 210 may be a digital micromirror device (DMD) or a liquid-crystal-on-silicon panel (LCOS panel). However, in other embodiments, the light valve 210 may also be a transmissive liquid crystal panel or other beam modulators.

Specifically, as shown in FIG. 2A and FIG. 2B, in this embodiment, the illumination system 100 is configured to emit the illumination beam 70. The illumination system 100 includes a laser light source 110, a light splitting element 120, a reflective element RE, a filter module 130, a wavelength conversion module 140, a first lens unit 150, a second lens unit 160, and a homogenizing element 170. The laser light source 110 is configured to provide a laser beam 50B to the light splitting element 120. For example, in this embodiment, the laser light source 110 may include a plurality of blue laser diodes arranged in an array, and the laser beam 50B is a blue laser beam, but the invention is not limited thereto. In this embodiment, the light splitting element 120 may be a dichroic mirror with red and green reflection, which provides reflection for red light and green light and allows blue light to penetrate. In this way, the light splitting element 120 allows the blue laser beam 50B penetrate and transmits the blue laser beam 50B to the filter module 130.

Further, as shown in FIG. 2A to FIG. 2C, in this embodiment, the filter module 130 is configured to rotate around a rotation axis F, and has a plurality of dichroic filter regions FR on a surface S131 perpendicular to the rotation axis F, wherein the plurality of dichroic filter regions FR include a first dichroic filter region FR1 and a second dichroic filter region FR2. For example, in this embodiment, the first dichroic filter region FR1 and the second dichroic filter region FR2 of the filter module 130 may respectively provide the optical function of reflection or penetration for the light transmitted through according to the requirements of light path design. Specifically, in this embodiment, the first dichroic filter region FR1 may be a dichroic mirror that can only transmit blue light, and is a blue light filter region.

On the other hand, in this embodiment, the second dichroic filter region FR2 may be a dichroic mirror that can reflect blue light and can only transmit light of a certain wavelength band (such as green light, yellow light or red light), and provide reflection for blue light and form a specific color light.

Furthermore, as shown in FIG. 2A and FIG. 2B, the filter module 130 is configured to receive the laser beam 50B from the light splitting element 120, and is located on the transmission path of the laser beam 50B from the light splitting element 120. When the laser beam 50B is transmitted to the filter module 130, the filter module 130 may make the first dichroic filter region FR1 of the plurality of dichroic filter regions FR cut into the transmission path of the laser beam 50B in the first period to allow the laser beam 50B to penetrate the first dichroic filter region FR1, and make the second dichroic filter region FR2 of the plurality of dichroic filter regions FR cut into the transmission path of the laser beam 50B in the second period to reflect the laser beam 50B.

Moreover, as shown in FIG. 2A, in this embodiment, the first lens unit 150 is located between the light splitting element 120 and the filter module 130, and is located on the transmission path of the laser beam 50B. The laser beam 50B passing the light splitting element 120 is parallel to the optical axis OA of the first lens unit 150 and enters the first lens unit 150 eccentrically. In other words, as shown in FIG. 2A, an acute angle is formed between the rotation axis F of the filter module 130 and a direction in which the laser beam 50B enters the filter module 130. The homogenizing element 170 is located on the transmission path of the laser beam 50B penetrating the filter module 130, and a long axis direction DL of the homogenizing element 170 is inclined with respect to a light incident surface IS of the homogenizing element 170 and not perpendicular to the light incident surface IS of the homogenizing element 170, and the light incident surface IS of the homogenizing element 170 is parallel to the surface S131 of the filter module 130. In this way, after the laser beam 50B in the first period obliquely enters the filter module 130, the laser beam 50B penetrates the first dichroic filter region FR1 of the filter module 130 and enters the homogenizing element 170 along the long axis direction DL of the homogenizing element 170 to form the blue light part of the illumination beam 70.

Further, as shown in FIG. 2B, in this embodiment, the reflective element RE is located on the transmission path of the laser beam 50B reflected by the filter module 130 for reflecting the laser beam 50B when the laser beam 50B is reflected by the second dichroic filter region FR2 of the plurality of dichroic filter regions FR. More specifically, as shown in FIG. 2B, in this embodiment, the reflective element RE and the light splitting element 120 are arranged side by side, and the reflective surface of the reflective element RE is parallel to the surface S121 of the light splitting element 120. In addition, the light splitting element 120 is located between the reflective element RE and the wavelength conversion module 140, the second lens unit 160 is located between the light splitting element 120 and the wavelength conversion module 140 and located on the transmission path of the laser beam 50B reflected by the filter module 130 and the reflective element RE.

Further, in this embodiment, the optical axis OA of the first lens unit 150 is a perpendicular bisector of a line between an irradiation region of the laser beam 50B on the light splitting element 120 and an irradiation region of the laser beam 50B on the reflective element RE. In addition, as shown in FIG. 2A, in the first period, the laser beam 50B may first form a first spot region SP1 on the irradiation region on the light splitting element 120, and as shown in FIG. 2B, in the second period, the laser beam 50B forms a second spot region SP2 in the irradiation region on the light splitting element 120 when being reflected by the filter module 130 and then transmitted through the light splitting element 120, wherein a center of the first spot region SP1 may overlap a center of the second spot region SP2. Moreover, since the center of the first spot region SP1 and the center of the second spot region SP2 are on the optical axis OA of the second lens unit 160, the laser beam 50B sequentially reflected by the reflective element RE and penetrating the light splitting element 120 may enter the second lens unit 160 along the optical axis OA of the second lens unit 160, and be transmitted to a wavelength conversion region WR of the wavelength conversion module 140.

Specifically, in this embodiment, the wavelength conversion module 140 has the wavelength conversion region WR for receiving the laser beam 50B. The wavelength conversion region WR is composed of a wavelength conversion layer, and may be configured to convert the laser beam 50B transmitted to the wavelength conversion region into a wavelength conversion beam 60Y. For example, in this embodiment, a wavelength conversion material includes phosphors that can be excited to a yellow beam which is the wavelength conversion beam 60Y. Moreover, since the wavelength conversion module 140 does not require a non-conversion region that allows the laser beam 50B to be transmitted without converting it into the wavelength conversion beam 60Y, the wavelength conversion module 140 does not need to rotate with time, and may be a stationary element that does not move. However, in other embodiments, the wavelength conversion module 140 may also be a rotating element having an annular wavelength conversion region WR, but the invention is not limited thereto.

In addition, as shown in FIG. 2B, in this embodiment, the second lens unit 160, the light splitting element 120, the first lens unit 150, and the homogenizing element 170 are also sequentially located on the transmission path of the wavelength conversion beam 60Y formed by the wavelength conversion module 140. In this way, the wavelength conversion beam 60Y may also be expanded by the second lens unit 160 and reflected to the first lens unit 150 by the light splitting element 120. Moreover, in this embodiment, the wavelength conversion beam 60Y passing the light splitting element 120 may also eccentrically enter the first lens unit 150 in parallel to the optical axis OA of the first lens unit 150 and may obliquely enter the filter module 130 and penetrate the second dichroic filter region FR2 for filtering out a predetermined color light, and then may enter the homogenizing element 170 along the long axis direction DL of the homogenizing element 170 to form the red light part or the green light part of the illumination beam 70.

In this embodiment, since different color light parts of the illumination beam 70 respectively through the first dichroic filter region FR1 and the second dichroic filter region FR2 of the filter module 130 are allowed to enter the homogenizing element 170 along the long axis direction DL of the homogenizing element 170, the different color light parts of the illumination beam 70 provided by the illumination system 100 have similar uniformity. As a result, the image beam 80 provided by the projection device 200 has favorable color uniformity and provides favorable image quality. Moreover, in this embodiment, since the wavelength conversion module 140 can be a stationary element that does not move, there is no need to provide an actuator for rotating the wavelength conversion module. Therefore, a small-sized fixed wavelength conversion module can be used to reduce the noise generated during rotation.

Figure 3A:
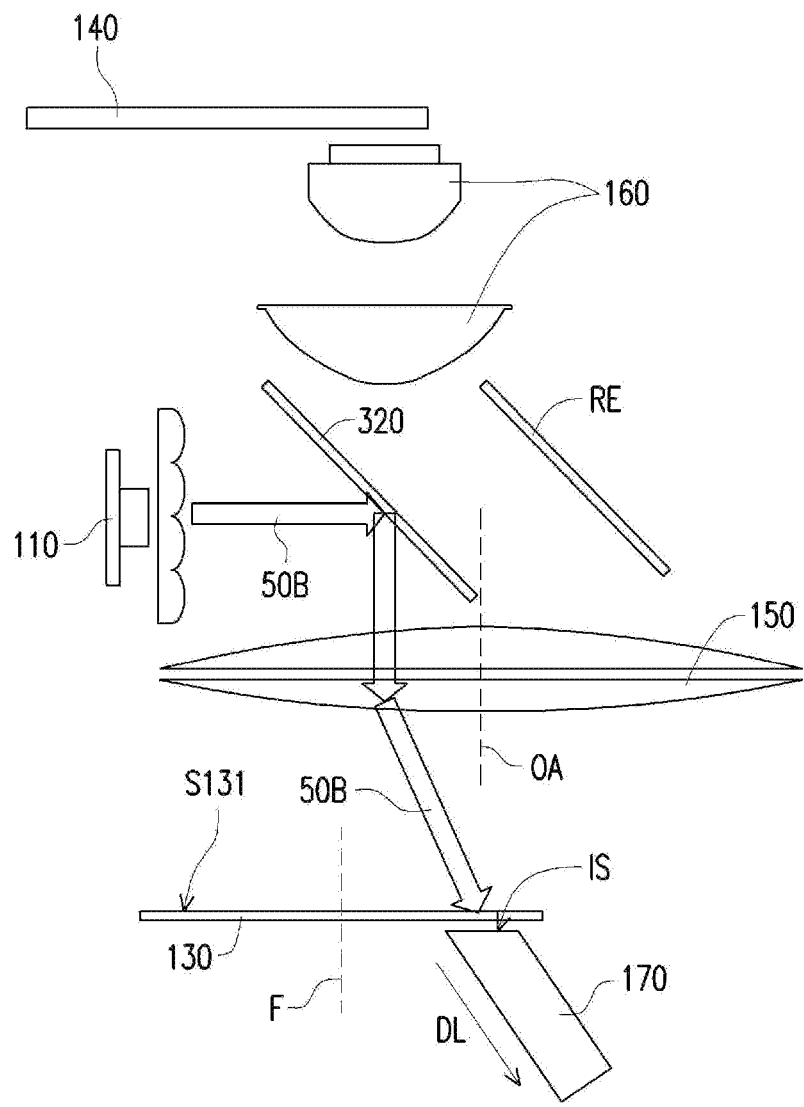
FIG. 3A is a schematic view of the light path of another illumination system of FIG. 1 in the first period.
Figure 3B:
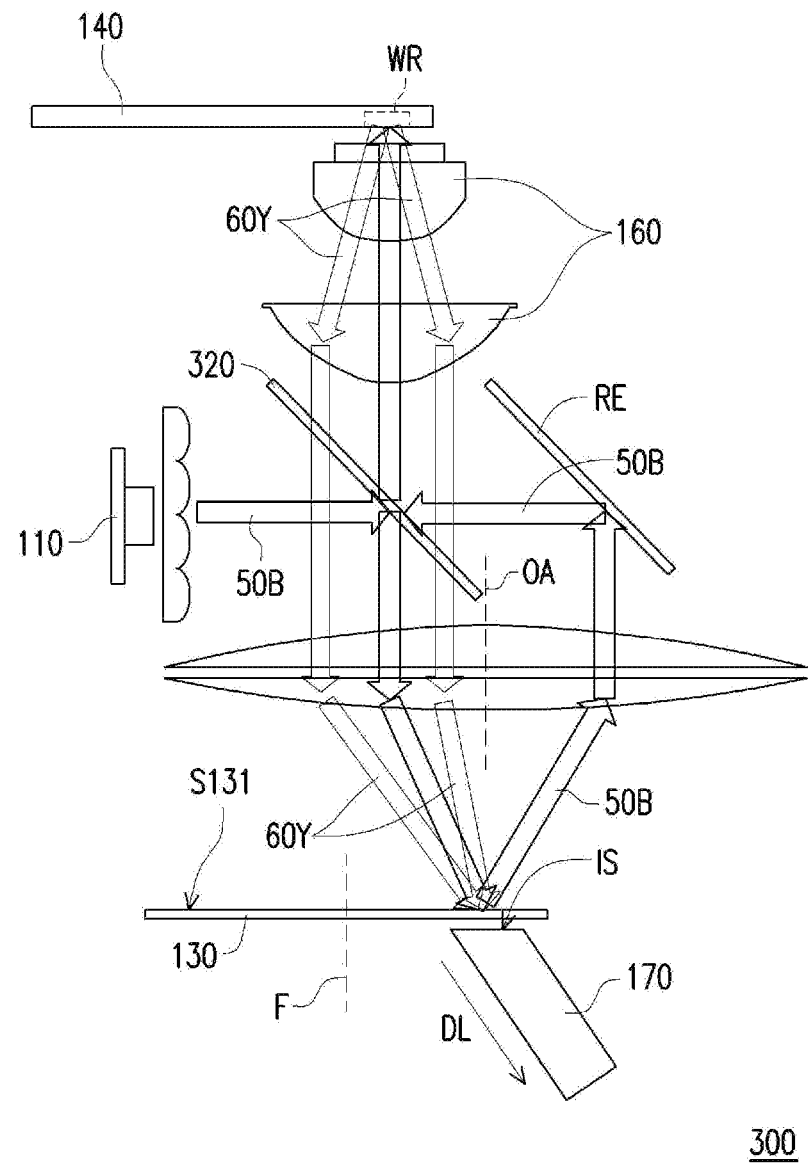
FIG. 3B is a schematic view of the light path of the illumination system of FIG. 3A in the second period.

FIG. 3A is a schematic view of the light path of another illumination system of FIG. 1 in the first period. FIG. 3B is a schematic view of the light path of the illumination system of FIG. 3A in the second period. Referring to FIG. 3A and FIG. 3B, the illumination system 300 of FIG. 3A and FIG. 3B is similar to the illumination system 100 of FIG. 2A, and the differences are as follows. In this embodiment, the light splitting element 320 is a dichroic mirror with blue reflection, which provides reflection for blue light and allows red light and green light to penetrate. In addition, the light splitting element 320 is located between the reflective element RE and the light source. In this way, as shown in FIG. 3A and FIG. 3B, the light splitting element 320 may reflect the blue laser beam 50B and transmit it to the filter module 130.

In this embodiment, the transmission path of the laser beam 50B after transmitted through the first dichroic filter region FR1 of the plurality of dichroic filter regions FR is the same as the light path of the laser beam 50B in the embodiment of FIG. 2A. Please refer to the above embodiments for related details, which will not be repeated hereinafter. On the other hand, after the laser beam 50B is reflected by the second dichroic filter region FR2 of the plurality of dichroic filter regions FR, the laser beam 50B is sequentially reflected by the reflective element RE and the light splitting element 320 and then transmitted to the wavelength conversion module 140. After being converted into the wavelength conversion beam 60Y by the wavelength conversion module 140, the wavelength conversion beam 60Y is transmitted to the second dichroic filter region FR2 of the plurality of dichroic filter regions FR through the light splitting element 320. Further, in this embodiment, the wavelength conversion beam 60Y passing the light splitting element 320 may also eccentrically enter the first lens unit 150 in parallel to the optical axis OA of the first lens unit 150 and may obliquely enter the filter module 130 and penetrate the second dichroic filter region FR2 for filtering out a predetermined color light, and then may enter the homogenizing element 170 along the long axis direction DL of the homogenizing element 170 to form the red light part or the green light part of the illumination beam 70.

Thus, in this embodiment, the wavelength conversion module 140 can still be a stationary element that does not move, and the illumination system 300 can still make different color light parts of the illumination beam 70 respectively through the first dichroic filter region FR1 and the second dichroic filter region FR2 of the filter module 130 enter the homogenizing element 170 along the long axis direction DL of the homogenizing element 170, thereby achieving effects and advantages similar to those of the illumination system 100 described above, and details thereof will not be repeated hereinafter. Moreover, when the illumination system 300 is applied to the projection device 200 of FIG. 1, the projection device 200 also achieves the effects and advantages described above, and details thereof will not be repeated hereinafter.

Figure 4A:
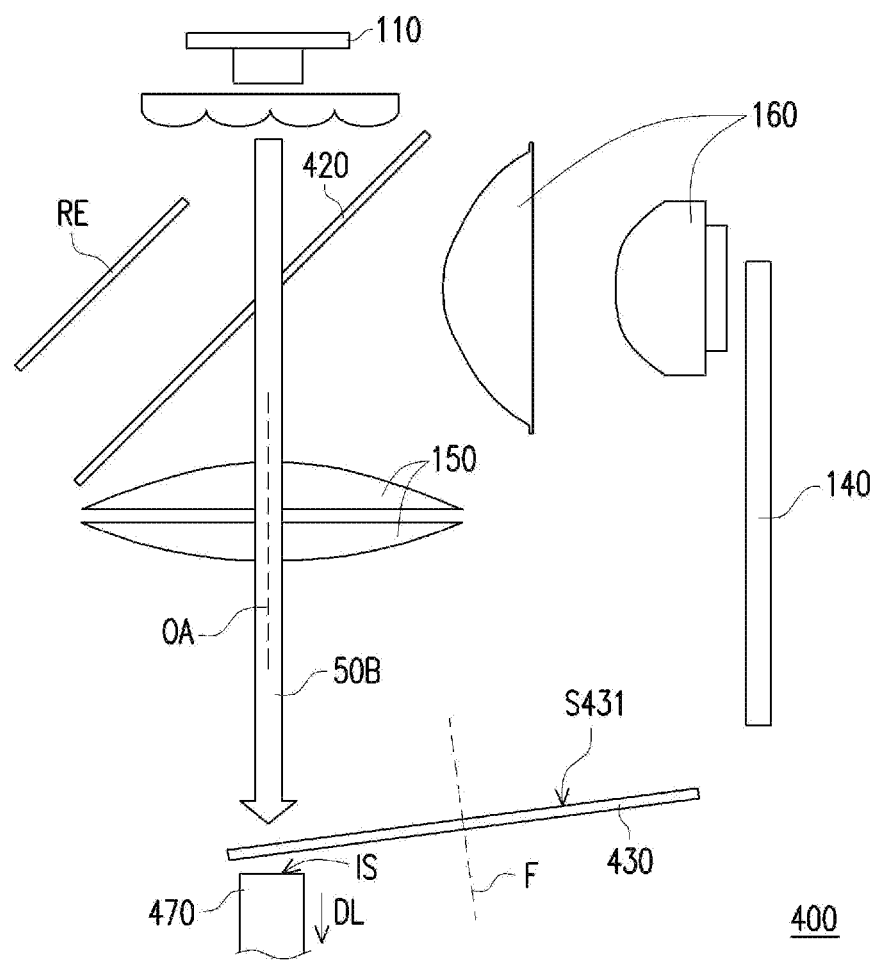
FIG. 4A is a schematic view of the light path of another illumination system of FIG. 1 in the first period.
Figure 4B:
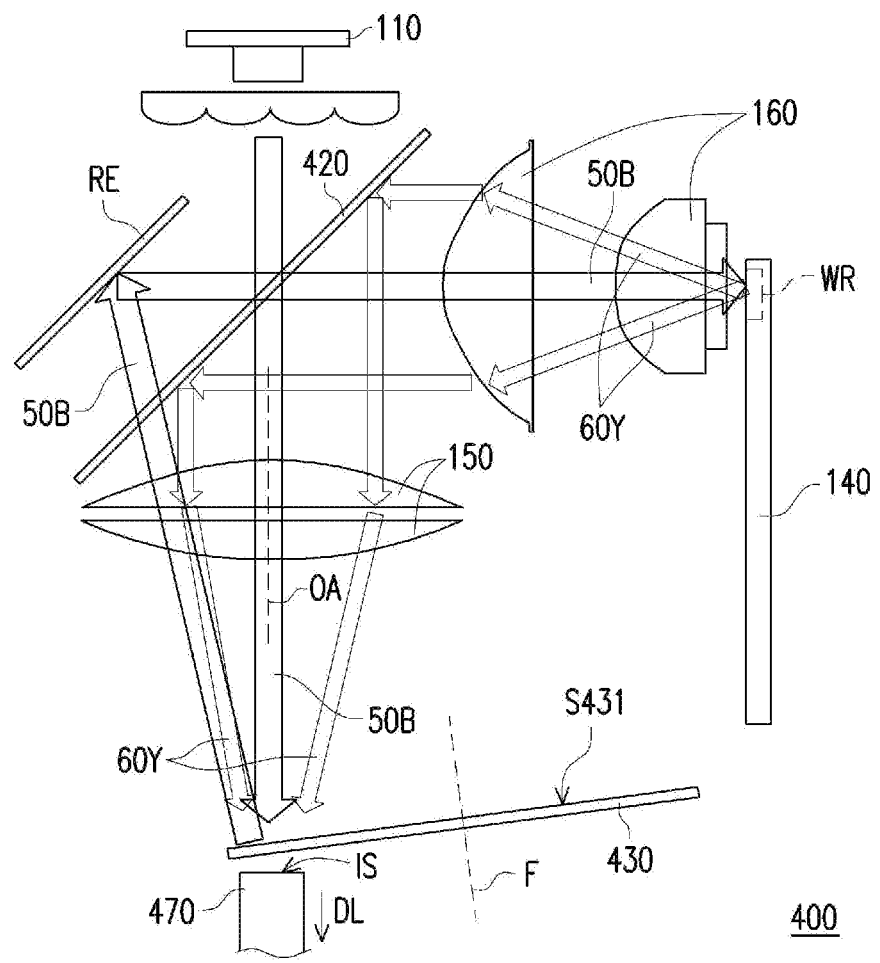
FIG. 4B is a schematic view of the light path of the illumination system of FIG. 4A in the second period.

FIG. 4A is a schematic view of the light path of another illumination system of FIG. 1 in the first period. FIG. 4B is a schematic view of the light path of the illumination system of FIG. 4A in the second period. Referring to FIG. 4A and FIG. 4B, the illumination system 400 of FIG. 4A and FIG. 4B is similar to the illumination system 100 of FIG. 2A, and the differences are as follows. In this embodiment, the long axis direction DL of the homogenizing element 470 is perpendicular to the light incident surface IS of the homogenizing element 470, and the surface S431 of the filter module 430 is inclined with respect to the light incident surface IS of the homogenizing element 470. In addition, the laser beam 50B in the first period converges along the optical axis OA of the first lens unit 150 and is incident normally on the light incident surface IS of the homogenizing element 470. Thus, as shown in FIG. 4A and FIG. 4B, the laser beam 50B in the first period may also be incident normally on the light incident surface IS of the homogenizing element 470 and penetrate the first dichroic filter region FR1 of the filter module 430, and then enter the homogenizing element 470 along the long axis direction DL of the homogenizing element 470 to form the blue light part of the illumination beam 70.

Moreover, in this embodiment, the transmission path of the laser beam 50B after transmitted through the second dichroic filter region FR2 of the plurality of dichroic filter regions FR is similar to the light path of the laser beam 50B in the embodiment of FIG. 2B, and the only difference is that, in this embodiment, the center of the reflective element RE deviates from the center of the light splitting element 420, and the laser beam 50B reflected by the filter module 430 penetrates one side of the light splitting element 420 and then is transmitted to the reflective element RE. Since the reflective element RE is still located on the transmission path of the laser beam 50B reflected by the filter module 430, the laser beam 50B may still be transmitted to the wavelength conversion module 140 after being reflected by the reflective element RE. In addition, as shown in FIG. 4B, after being reflected by the light splitting element 420, the wavelength conversion beam 60Y in the second period may still converge along the optical axis OA of the first lens unit 150 and be incident normally on the light incident surface IS of the homogenizing element 470 to form the red light part and green light part of the illumination beam 70.

Thus, in this embodiment, the illumination system 400 can still make different color light parts of the illumination beam 70 respectively through the first dichroic filter region FR1 and the second dichroic filter region FR2 of the filter module 430 enter the homogenizing element 470 along the long axis direction DL of the homogenizing element 470, and the wavelength conversion module 140 can still be a stationary element that does not move, thereby achieving effects and advantages similar to those of the illumination system 100 described above, and details thereof will not be repeated hereinafter. Moreover, when the illumination system 400 is applied to the projection device 200 of FIG. 1, the projection device 200 also achieves the effects and advantages described above, and details thereof will not be repeated hereinafter.

Figure 5A:
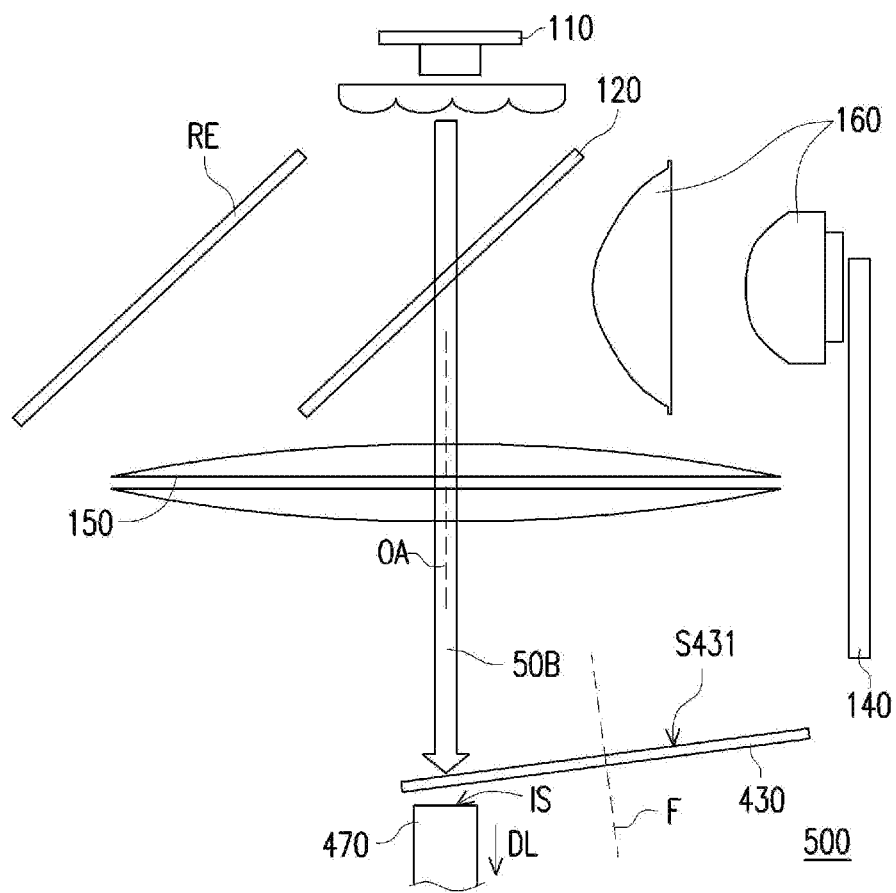
FIG. 5A is a schematic view of the light path of another illumination system of FIG. 1 in the first period.
Figure 5B:
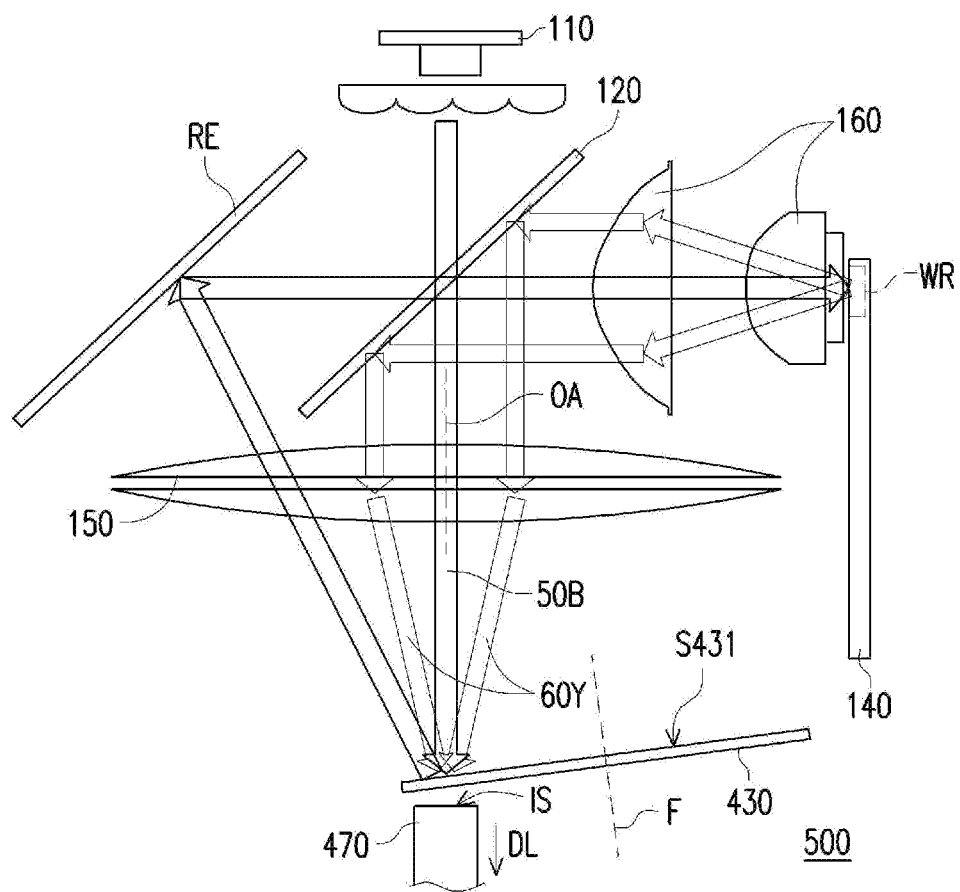
FIG. 5B is a schematic view of the light path of the illumination system of FIG. 5A in the second period.

FIG. 5A is a schematic view of the light path of another illumination system of FIG. 1 in the first period. FIG. 5B is a schematic view of the light path of the illumination system of FIG. 5A in the second period. Referring to FIG. 5A and FIG. 5B, the illumination system 500 of FIG. 5A and FIG. 5B is similar to the illumination system 100 of FIG. 2A, and the differences are as follows. In this embodiment, the long axis direction DL of the homogenizing element 470 is perpendicular to the light incident surface IS of the homogenizing element 470, and the surface S431 of the filter module 430 is inclined with respect to the light incident surface IS of the homogenizing element 470. In addition, the laser beam 50B in the first period converges along the optical axis OA of the first lens unit 150 and is incident normally on the light incident surface IS of the homogenizing element 470. Thus, as shown in FIG. 5A and FIG. 5B, the laser beam 50B in the first period may also be incident normally on the light incident surface IS of the homogenizing element 470 and penetrate the first dichroic filter region FR1 of the filter module 430, and then enter the homogenizing element 470 along the long axis direction DL of the homogenizing element 470 to form the blue light part of the illumination beam 70.

Moreover, in this embodiment, the transmission path of the laser beam 50B after transmitted through the first dichroic filter region FR1 of the plurality of dichroic filter regions FR is the same as the light path of the laser beam 50B in the embodiment of FIG. 4A, and the transmission path of the laser beam 50B after transmitted through the second dichroic filter region FR2 of the plurality of dichroic filter regions FR is similar to the light path of the laser beam 50B in the embodiment of FIG. 4B, and the only difference is that, in this embodiment, the reflective element RE and the light splitting element 120 are arranged side by side, and the reflective surface of the reflective element RE is parallel to the surface S121 of the light splitting element 120. Therefore, the laser beam 50B passing the filter module 430 does not pass through the light splitting element 120 first, but is directly reflected by the reflective element RE and then transmitted to the light splitting element 120. The light path thereafter is the same as that of the embodiment of FIG. 4B. Please refer to the above paragraphs for related details, which will not be repeated hereinafter.

Thus, in this embodiment, the illumination system 500 can still make different color light parts of the illumination beam 70 respectively through the first dichroic filter region FR1 and the second dichroic filter region FR2 of the filter module 430 enter the homogenizing element 470 along the long axis direction DL of the homogenizing element 470, and the wavelength conversion module 140 can still be a stationary element that does not move, thereby achieving effects and advantages similar to those of the illumination system 100 described above, and details thereof will not be repeated hereinafter. Moreover, when the illumination system 500 is applied to the projection device 200 of FIG. 1, the projection device 200 also achieves the effects and advantages described above, and details thereof will not be repeated hereinafter.

Figure 6A:
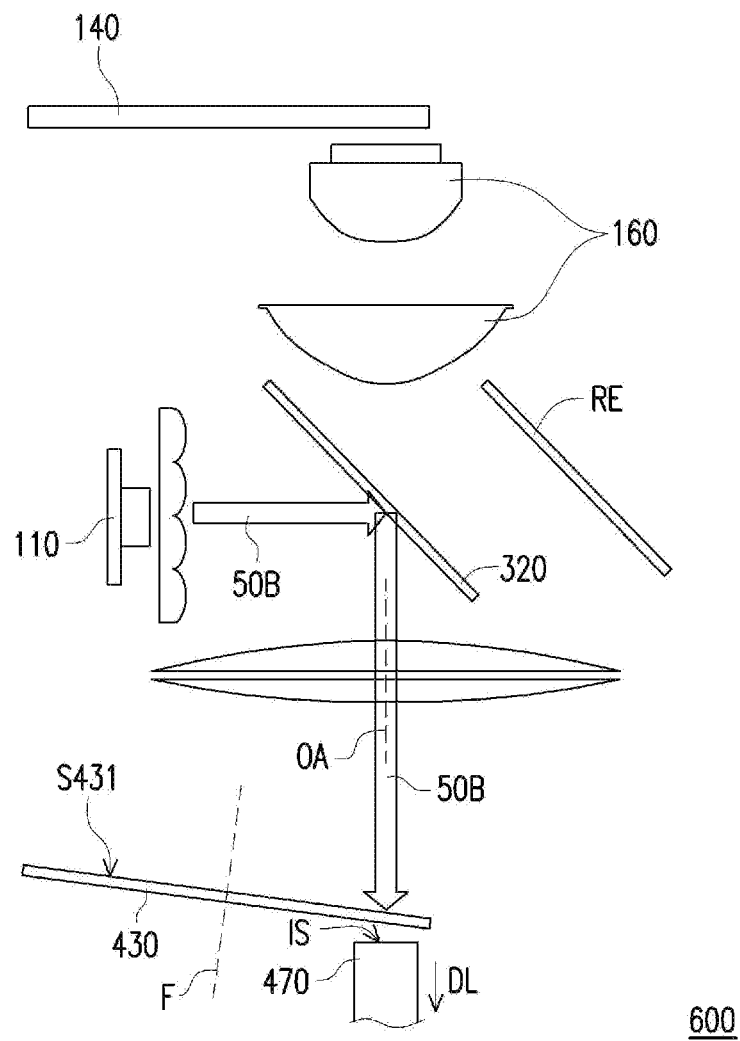
FIG. 6A is a schematic view of the light path of another illumination system of FIG. 1 in the first period.
Figure 6B:
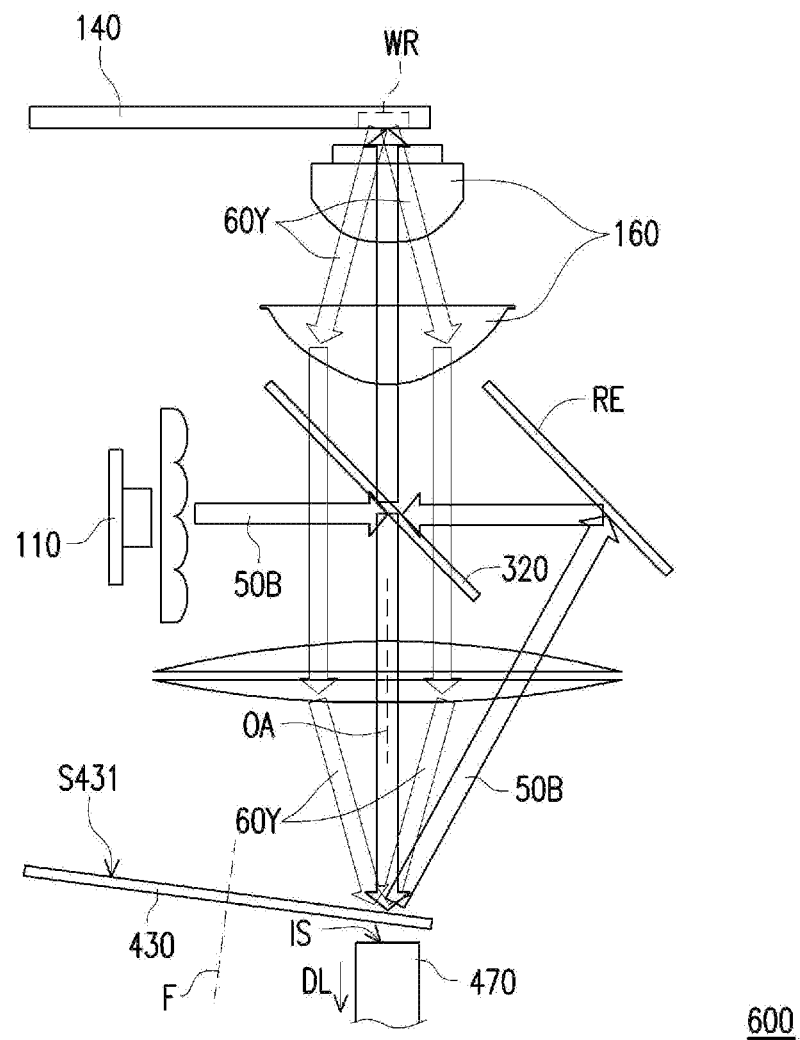
FIG. 6B is a schematic view of the light path of the illumination system of FIG. 6A in the second period.

FIG. 6A is a schematic view of the light path of another illumination system 100 of FIG. 1 in the first period. FIG. 6B is a schematic view of the light path of the illumination system 100 of FIG. 6A in the second period.

Referring to FIG. 6A and FIG. 6B, the illumination system 600 of FIG. 6A and FIG. 6B is similar to the illumination system 300 of FIG. 3A, and the differences are as follows. In this embodiment, the long axis direction DL of the homogenizing element 470 is perpendicular to the light incident surface IS of the homogenizing element 470, and the surface S431 of the filter module 430 is inclined with respect to the light incident surface IS of the homogenizing element 470. In addition, the laser beam 50B in the first period converges along the optical axis OA of the first lens unit 150 and is incident normally on the light incident surface IS of the homogenizing element 470. Thus, as shown in FIG. 6A and FIG. 6B, the laser beam 50B in the first period may also be incident normally on light incident surface IS of the homogenizing element 470 and penetrate the first dichroic filter region FR1 of the filter module 430, and then enter the homogenizing element 470 along the long axis direction DL of the homogenizing element 470 to form the blue light part of the illumination beam 70.

Moreover, in this embodiment, in the first period, the transmission path of the laser beam 50B after transmitted through the light splitting element 320 is the same as the light path of the laser beam 50B in the embodiment of FIG. 3A. Please refer to the above paragraphs for related details, which will not be repeated hereinafter.

On the other hand, after the laser beam 50B is reflected by the second dichroic filter region FR2 of the plurality of dichroic filter regions FR, the laser beam 50B is sequentially reflected by the reflective element RE and the light splitting element 320 and transmitted to the wavelength conversion module 140, and then converted into the wavelength conversion beam 60Y by the wavelength conversion module 140. Next, the wavelength conversion beam 60Y is transmitted to the second dichroic filter region FR2 of the plurality of dichroic filter regions FR through the light splitting element 320. Further, in this embodiment, the wavelength conversion beam 60Y passing the light splitting element 320 may also enter the filter module 430 along the optical axis OA of the first lens unit 150 and penetrate the second dichroic filter region FR2 for filtering out a predetermined color light, and then may enter the homogenizing element 470 along the long axis direction DL of the homogenizing element 470 to form the red light part or the green light part of the illumination beam 70.

Thus, in this embodiment, the illumination system 600 can still make different color light parts of the illumination beam 70 respectively through the first dichroic filter region FR1 and the second dichroic filter region FR2 of the filter module 430 enter the homogenizing element 470 along the long axis direction DL of the homogenizing element 470, and the wavelength conversion module 140 can still be a stationary element that does not move, thereby achieving effects and advantages similar to those of the illumination system 300 described above, and details thereof will not be repeated hereinafter. Moreover, when the illumination system 600 is applied to the projection device 200 of FIG. 1, the projection device 200 also achieves the effects and advantages described above, and details thereof will not be repeated hereinafter.

In summary of the above, the embodiments of the invention have at least one of the following advantages or effects. In the embodiments of the invention, since different color light parts of the illumination beam respectively through the first dichroic filter region and the second dichroic filter region of the filter module can enter the homogenizing element along the long axis direction of the homogenizing element, the different color light parts of the illumination beam all have similar uniformity. As a result, the image beam has favorable color uniformity and provides favorable image quality. In addition, in the embodiments, since the wavelength conversion module can be a stationary element that does not move, there is no need to provide an actuator for rotating the wavelength conversion module. Therefore, a small-sized fixed wavelength conversion module can be configured to reduce the noise generated during rotation.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system configured to emit an illumination beam, and comprising a laser light source, a light splitting element, a wavelength conversion module, a filter module, and a homogenizing element, wherein:
   the laser light source is configured to provide a laser beam to the light splitting element;
   the wavelength conversion module has a wavelength conversion region for receiving the laser beam;
   the filter module is configured to rotate around a rotation axis and has a light passing region and at least one dichroic filter region on a surface perpendicular to the rotation axis, the filter module is configured to receives the laser beam from the light splitting element, wherein
   in a first period, the laser beam penetrate the light passing region; and
   in a second period, the laser beam is reflected to the wavelength conversion module by the at least one dichroic filter region, the laser beam is converted into a wavelength conversion beam by the wavelength conversion region, and the wavelength conversion beam is transmitted to the filter module and penetrates the at least one dichroic filter region; and
   the homogenizing element is located on transmission paths of the laser beam and the wavelength conversion beam, and the laser beam and the wavelength conversion beam enter the homogenizing element, wherein a long axis direction of the homogenizing element is inclined with respect to a light incident surface of the homogenizing element, the light incident surface of the homogenizing element is parallel to the surface of the filter module.

2. The illumination system according to claim 1, wherein the illumination system further comprises:
   a reflective element located on a transmission path of the laser beam reflected by the filter module, wherein the laser beam is reflected to the light splitting element by the reflective element and then transmitted to the wavelength conversion region of the wavelength conversion module.

3. The illumination system according to claim 2, wherein the reflective element and the light splitting element are arranged side by side, and a reflective surface of the reflective element is parallel to a surface of the light splitting element.

4. The illumination system according to claim 2, wherein the illumination system further comprises:
   a first lens unit located between the light splitting element and the filter module and located on a transmission path of the laser beam and the wavelength conversion beam, wherein the laser beam and the wavelength conversion beam through the light splitting element eccentrically enter the first lens unit in parallel to an optical axis of the first lens unit, so that the laser beam in the first period and the wavelength conversion beam in the second period obliquely enter the filter module and then enter the homogenizing element along the long axis direction of the homogenizing element.

5. The illumination system according to claim 4, wherein in the second period, the optical axis of the first lens unit is a perpendicular bisector of a line between an irradiation region of the laser beam on the light splitting element and an irradiation region of the laser beam on the reflective element.

6. The illumination system according to claim 1, wherein the long axis direction of the homogenizing element is perpendicular to the light incident surface of the homogenizing element, and the illumination system further comprises:
   a first lens unit located between the light splitting element and the filter module and located on a transmission path of the laser beam and the wavelength conversion beam, wherein the laser beam in the first period and the wavelength conversion beam in the second period converge along an optical axis of the first lens unit and are incident normally on the light incident surface of the homogenizing element.

7. The illumination system according to claim 2, wherein the light splitting element is located between the reflective element and the laser light source, or located between the reflective element and the wavelength conversion module.

8. The illumination system according to claim 1, wherein in the first period, the laser beam forms a first spot region in an irradiation region on the light splitting element, and in the second period, the laser beam forms a second spot region in the irradiation region on the light splitting element when being reflected by the filter module and then transmitted through the light splitting element, wherein a center of the first spot region overlaps a center of the second spot region.

9. The illumination system according to claim 1, wherein the wavelength conversion module is stationary.

10. A projection device, comprising an illumination system, a light valve, and a projection lens, wherein:
    the illumination system is configured to emit an illumination beam, and comprises a laser light source, a light splitting element, a wavelength conversion module, a filter module, and a homogenizing element, wherein:
    the laser light source is configured to provide a laser beam to the light splitting element;
    the wavelength conversion module has a wavelength conversion region for receiving the laser beam;
    the filter module is configured to rotate around a rotation axis and has a light passing region and at least one dichroic filter regions on a surface perpendicular to the rotation axis, the filter module is configured to receive the laser beam from the light splitting element, wherein in a first period, the laser beam penetrates the light passing region;

in a second period, the laser beam is reflected to the wavelength conversion module by the at least one dichroic filter region, the laser beam is converted into a wavelength conversion beam by the wavelength conversion region, and the wavelength conversion beam is transmitted to the filter module and penetrates the at least one dichroic filter region; and the homogenizing element is located on transmission paths of the laser beam and the wavelength conversion beam, and the laser beam and the wavelength conversion beam enter the homogenizing element, wherein a long axis direction of the homogenizing element is inclined with respect to a light incident surface of the homogenizing element, the light incident surface of the homogenizing element is parallel to the surface of the filter module;

the light valve is located on a transmission path of the illumination beam and is configured to convert the illumination beam into an image beam; and the projection lens is located on a transmission path of the image beam and is configured to project the image beam out of the projection device.

11. The projection device according to claim 10, wherein the illumination system further comprises:

a reflective element located on a transmission path of the laser beam reflected by the filter module, wherein the laser beam is reflected to the light splitting element by the reflective element and then transmitted to the wavelength conversion region of the wavelength conversion module.

12. The projection device according to claim 11, wherein the reflective element and the light splitting element are arranged side by side, and a reflective surface of the reflective element is parallel to a surface of the light splitting element.

13. The projection device according to claim 11, wherein the illumination system further comprises:

a first lens unit located between the light splitting element and the filter module and located on a transmission path of the laser beam and the wavelength conversion beam, wherein the laser beam and the wavelength conversion beam through the light splitting element eccentrically enter the first lens unit in parallel to an optical axis of the first lens unit, so that the laser beam in the first period and the wavelength conversion beam in the second period obliquely enter the filter module and then enter the homogenizing element along the long axis direction of the homogenizing element.

14. The projection device according to claim 13, wherein in the second period, the optical axis of the first lens unit is a perpendicular bisector of a line between an irradiation region of the laser beam on the light splitting element and an irradiation region of the laser beam on the reflective element.

15. The projection device according to claim 10, wherein the long axis direction of the homogenizing element is perpendicular to the light incident surface of the homogenizing element, and the illumination system further comprises:

a first lens unit located between the light splitting element and the filter module and located on a transmission path of the laser beam and the wavelength conversion beam, wherein the laser beam in the first period and the wavelength conversion beam in the second period converge along an optical axis of the first lens unit and are incident normally on the light incident surface of the homogenizing element.

16. The projection device according to claim 11, wherein the light splitting element is located between the reflective element and the laser light source, or located between the reflective element and the wavelength conversion module.

17. The projection device according to claim 10, wherein in the first period, the laser beam forms a first spot region in an irradiation region on the light splitting element, and in the second period, the laser beam forms a second spot region in the irradiation region on the light splitting element when being reflected by the filter module and then transmitted through the light splitting element, wherein a center of the first spot region overlaps a center of the second spot region.

18. The projection device according to claim 10, wherein the wavelength conversion module is stationary.

19. A projection device, comprising an illumination system, a light valve, and a projection lens, wherein:

the illumination system is configured to emit an illumination beam, and comprises a laser light source, a light splitting element, a wavelength conversion module, a filter module, and a homogenizing element, wherein:

the laser light source is configured to provide a laser beam to the light splitting element;

the wavelength conversion module has a wavelength conversion region for receiving the laser beam;

the filter module is configured to rotate around a rotation axis and has a light passing region and at least one dichroic filter region on a surface perpendicular to the rotation axis, the filter module is configured to receive the laser beam from the light splitting element, wherein in a first period, the laser beam penetrates the light passing region;

in a second period, the laser beam is reflected to the wavelength conversion module by the at least one dichroic filter region, the laser beam is converted into a wavelength conversion beam by the wavelength conversion region, and the wavelength conversion beam is transmitted to the filter module and penetrates the at least one dichroic filter region; and the homogenizing element is located on transmission paths of the laser beam and the wavelength conversion beam, and the laser beam and the wavelength conversion beam enter the homogenizing element, wherein the illumination system further comprises a reflective element located on a transmission path of the laser beam reflected by the filter module, wherein the laser beam is reflected to the light splitting element by the reflective element and then transmitted to the wavelength conversion region of the wavelength conversion module;

the light valve is located on a transmission path of the illumination beam and is configured to convert the illumination beam into an image beam; and the projection lens is located on a transmission path of the image beam and is configured to project the image beam out of the projection device.

20. A projection device, comprising an illumination system, a light valve, and a projection lens, wherein:

the illumination system is configured to emit an illumination beam, and comprises a laser light source, a light splitting element, a wavelength conversion module, a filter module, and a homogenizing element, wherein:

the laser light source is configured to provide a laser beam to the light splitting element;

the wavelength conversion module has a wavelength conversion region for receiving the laser beam;

the filter module is configured to rotate around a rotation axis and has a light passing region and at least one dichroic filter region on a surface perpendicular to the rotation axis, the filter module is configured to receive the laser beam from the light splitting element, wherein in a first period, the laser beam penetrates the light passing region;

in a second period, the laser beam is reflected to the wavelength conversion module by the at least one dichroic filter region, the laser beam is converted into a wavelength conversion beam by the wavelength conversion region, and the wavelength conversion beam is transmitted to the filter module and penetrates the at least one dichroic filter region; and the homogenizing element is located on transmission paths of the laser beam and the wavelength conversion beam, and the laser beam and the wavelength conversion beam enter the homogenizing element, wherein the surface of the filter module is inclined with respect to a light incident surface of the homogenizing element;

the light valve is located on a transmission path of the illumination beam and is configured to convert the illumination beam into an image beam; and the projection lens is located on a transmission path of the image beam and is configured to project the image beam out of the projection device.

21. A projection device, comprising an illumination system, a light valve, and a projection lens, wherein:

the illumination system is configured to emit an illumination beam, and comprises a laser light source, a light splitting element, a wavelength conversion module, a filter module, and a homogenizing element, wherein:

the laser light source is configured to provide a laser beam to the light splitting element;

the wavelength conversion module has a wavelength conversion region for receiving the laser beam;

the filter module is configured to rotate around a rotation axis and has a light passing region and at least one dichroic filter region on a surface perpendicular to the rotation axis, the filter module is configured to receive the laser beam from the light splitting element, wherein in a first period, the laser beam penetrates the light passing region;

in a second period, the laser beam is reflected to the wavelength conversion module by the at least one dichroic filter region, the laser beam is converted into a wavelength conversion beam by the wavelength conversion region, and the wavelength conversion beam is transmitted to the filter module and penetrates the at least one dichroic filter region; and the homogenizing element is located on transmission paths of the laser beam and the wavelength conversion beam, and the laser beam and the wavelength conversion beam enter the homogenizing element, wherein in the first period, the laser beam forms a first spot region in an irradiation region on the light splitting element, and in the second period, the laser beam forms a second spot region in the irradiation region on the light splitting element when being reflected by the filter module and then transmitted through the light splitting element, wherein a center of the first spot region overlaps a center of the second spot region;

the light valve is located on a transmission path of the illumination beam and is configured to convert the illumination beam into an image beam; and the projection lens is located on a transmission path of the image beam and is configured to project the image beam out of the projection device.

* * * * *